US008668753B2

(12) United States Patent
Goetsch et al.

(10) Patent No.: US 8,668,753 B2
(45) Date of Patent: Mar. 11, 2014

(54) TWO STAGE PROCESS FOR CONVERTING BIOMASS TO SYNGAS

(75) Inventors: Duane A. Goetsch, Andover, MN (US); Jacqueline R. Hitchingham, Anoka, MN (US); Lloyd R. White, Minneapolis, MN (US)

(73) Assignee: G.D.O. Inc, Elk River, MN (US)

( * ) Notice: Subject to any disclaimer, the term of this patent is extended or adjusted under 35 U.S.C. 154(b) by 225 days.

(21) Appl. No.: 13/348,229

(22) Filed: Jan. 11, 2012

(65) Prior Publication Data

US 2012/0193581 A1 Aug. 2, 2012

Related U.S. Application Data

(63) Continuation-in-part of application No. 12/767,501, filed on Apr. 26, 2010, now abandoned.

(60) Provisional application No. 61/214,482, filed on Apr. 24, 2009, provisional application No. 61/295,355, filed on Jan. 15, 2010, provisional application No. 61/270,645, filed on Jul. 10, 2009.

(51) Int. Cl.
*C01B 3/36* (2006.01)

(52) U.S. Cl.
USPC .......................................................... 48/197 R (58) Field of Classification Search
None
See application file for complete search history.

(56) References Cited

U.S. PATENT DOCUMENTS

| | | | |
|---|---|---|---|
| 5,494,653 A * | 2/1996 | Paisley | 423/652 |
| 6,767,375 B1 | 7/2004 | Pearson | |
| 6,972,114 B2 | 12/2005 | Pope et al. | |
| 7,228,806 B2 | 6/2007 | Dueck et al. | |
| 2002/0134019 A1* | 9/2002 | Paisley | 48/197 R |
| 2002/0194782 A1* | 12/2002 | Paisley | 48/197 FM |
| 2004/0045272 A1* | 3/2004 | Miyoshi et al. | 60/39.12 |
| 2004/0182003 A1* | 9/2004 | Bayle et al. | 48/210 |
| 2004/0244289 A1* | 12/2004 | Morozumi et al. | 48/77 |
| 2005/0250862 A1* | 11/2005 | Bayle et al. | 518/702 |
| 2007/0094929 A1* | 5/2007 | Kang et al. | 48/111 |
| 2008/0153048 A1* | 6/2008 | Murakami et al. | 432/17 |
| 2008/0216405 A1 | 9/2008 | Ichikawa et al. | |
| 2008/0244976 A1* | 10/2008 | Paisley | 48/62 R |
| 2010/0024297 A1* | 2/2010 | Suda et al. | 48/61 |

* cited by examiner

*Primary Examiner* — Imran Akram
(74) *Attorney, Agent, or Firm* — Henry E. Naylor (57) ABSTRACT

A two stage conversion process for converting biomass to a syngas, wherein the first stage is a gasification stage and the second stage is a combustion stage.

21 Claims, 4 Drawing Sheets

TWO STAGE PROCESS FOR CONVERTING BIOMASS TO SYNGAS

CROSS REFERENCE TO RELATED APPLICATIONS

This application is a continuation-in-part of U.S. Ser. No. 12/767,501 filed Apr. 26, 2010 which claims benefit of Provisional Applications 61/214,482 filed Apr. 24, 2009; 61/270,645 filed Jul. 10, 2009; and 61/295,355 filed Jan. 15, 2010.

FIELD OF THE INVENTION

The present invention relates to a two stage process for converting biomass to a syngas. The first stage is a gasification stage and the second stage is a combustion stage.

BACKGROUND OF THE INVENTION

Gasification is a process used to convert carbonaceous materials, such as coal, petroleum, or biomass into predominantly carbon monoxide and hydrogen (syngas) by reacting the carbonaceous material at high temperatures. Syngas may be burned directly in internal combustion engines, used to produce methanol and hydrogen, or converted via the Fischer-Tropsch process to synthetic fuels.

A wide variety of carbon-containing materials can be used as a feedstock for gasification, including biomass and plastic waste. Gasification has the potential to be an important technology for renewable energy and is generally carbon neutral. U.S. Pat. No. 6,767,375 teaches a biomass gasifier reactor for producing syngas. The biomass gasifier includes a helical coil disposed concentrically in a reactor vessel having a burner positioned at the bottom of the vessel and a generally cylindrical heat shield having a truncated conical section with the bottom of the cylinder closed at the end toward the burner.

U.S. Pat. No. 7,228,806 teaches a biomass gasification system comprised of a primary combustion chamber, a rotating grate within the primary combustion chamber for supporting the biomass during gasification, a feeder unit in communication with the primary combustion chamber, a secondary combustion chamber, an oxygen mixer, and a heat exchanger and an exhaust stack. Also, U.S. Pat. No. 6,972,114 teaches a biomass gasifier and method for producing low BTU gas while removing char and ash.

United States Patent Application No. 2008/0216405 teaches carbonization and gasification of biomass wherein the biomass is first carbonized, and the resulting char and pyrolysis gas fed respectively to a high temperature gasifying step and to a gas reformer. This helps maintain the temperature required to avoid tar formation in the gas reformer stage.

Biomass gasification carries significant energy debits compared to coal and petroleum based feed materials due to its relatively low carbon content. Gasification reactions are complicated by the presence of relatively high oxygen levels, resulting in a significant amount of $CO_2$ in the product synthesis gas. Most biomass gasifiers currently in use, or under commercial development, operate at relatively low pressures (<100 psig) in order to achieve the desired thermal flux necessary to achieve high gasification yields while minimizing the formation of undesired tar and soot.

Since gasification is an endothermic reaction, heat must be supplied either indirectly through exchange with a hot heat transfer surface, or directly by the simultaneous heat release associated with partial oxidation resulting from the introduction of oxygen-containing gas into the reactor. Most biomass contains significant amounts of inorganic material (i.e. silica, potassium and other elements) which do not undergo gasification and which can agglomerate and fuse into a phase commonly referred to as slag when exposed to elevated temperatures (typically >1800° F.). Gasifiers that are designed to minimize slag formation, and use partial oxidation to generate the required thermal energy for gasification (directly heated gasifiers), must control the addition of oxygen in order to avoid excessive temperatures within the partial oxidation zone.

While there is significant activity in the field of converting biomass to fuel products using gasification, there is still a need in the art for improved and more efficient processes for achieving same.

SUMMARY OF THE INVENTION

In accordance with the present invention there is provided a process for converting a biomass material to a syngas, which biomass material has an organic fraction and an inorganic fraction, which process is performed in a two-stage fluid bed process unit wherein the first stage is a fluid bed gasification stage and the second stage is a fluid bed combustion stage and wherein the two stages are fluidly connected by way of a first conduit having an inlet end and an outlet end wherein the inlet end is located in said combustion stage and said outlet end is located in said gasification stage and a second conduit having an inlet end located in said gasification stage and an outlet end located in said combustion stage; which process comprising:

a) introducing an effective amount of a fluidizing gas through at least one set of a plurality of nozzles located at the bottom section of both the gasification stage and the combustion stage to maintain both beds of both stages in a fluidized form;

b) introducing an effective amount of oxygen through one or more plurality of nozzles located at the bottom section of said gasification stage to maintain a predetermined temperature of the fluid bed of the gasification stage below the fusion temperature of at least a portion of the inorganic fraction of the biomass material, and also limit the highest temperature to that which does not significantly volatilize any inorganic constituents into the syngas;

c) maintaining said bulk fluid bed gasification stage at a temperature from about 1000° F. to about 1800° F. and under net reducing conditions;

d) introducing a biomass material, having an effective average particle size, through the inlet of said first conduit and transporting it to said gasification stage wherein at least about 70 wt. % of the organic fraction of said biomass is converted to a syngas product and a particulate solids product;

e) conducting at least a portion of said syngas product to a solid/gas separation zone wherein any particulates greater than a predetermined size that are entrained in the syngas product are separated and returned to said gasification zone and wherein the treated syngas product is collected or sent to downstream processing;

f) conducting at least a portion of the fluidizing solids from said gasification stage through said second conduit to a fluidized combustion stage operated at a temperature at least 50° F. greater than said gasification stage to result in the combustion of at least a fraction of the particulate solids product of said gasification stages and heating said fluidizing solids;

g) conducting said heated fluidizing solids from said combustion stage through said first conduit to said gasification stage, thus providing a portion of the heat needed for said gasification state; and k) removing any excess solids from the gasification process unit to maintain a predetermined balance of solids.

In a preferred embodiment the oxygen-rich gas is introduced into the gasification zone by pulsing through a plurality of suitable nozzles.

In another preferred embodiment the biomass material is dried then reduced to an average particle size from about 1 micron to about 500 microns before being fed to the gasification stage.

In another preferred embodiment the biomass material is reduced in size up to about 3 inches, then subjected to torrefaction at a temperature from about 390° F. to about 665° F. then further reduced in size to about 1 micron to about 500 microns prior to being introduced into the gasification stage.

DETAILED DESCRIPTION OF THE INVENTION

This description will enable one skilled in the art to make and use the present invention, and it describes several embodiments, adaptations, variations, alternatives, and uses of the present invention, including what is presently believed to be the best mode of carrying out the invention.

As used in this specification and the appended claims, the singular forms "a", "an", and "the" include plural referents unless the context clearly indicates otherwise. Unless defined otherwise, all technical and scientific terms used herein have the same meaning as in commonly understood by one of ordinary skill in the art to which this invention belongs.

Unless otherwise indicated, all numbers expressing reaction conditions, stoichiometries, concentrations or components, and so forth used in the specification and claims are to be understood as being modified in all instances by the term "about". Accordingly, unless indicated to the contrary, the numerical parameters set forth in the following specification and attached claims are approximations that may vary depending at least upon a specific analytical technique.

Any biomass feedstock can be used in the practice of the present invention. Preferred are plant biomass feedstocks, typically referred to as lignocellulosic feedstocks, which are generally comprised of cellulose, hemicellulose, and lignin. Non-limiting examples of plant, or lignocellulosic, feedstocks include non-woody plant biomass, cultivated crops, such as, but not limited to, grasses, for example, but not limited to, C4 grasses, such as switchgrass, cord grass, rye grass, miscanthus, reed canary grass, or a combination thereof, or sugar processing residues such as bagasse, or beet pulp, agricultural residues, for example, soybean stover, corn stover, rice straw, rice hulls, barley straw, corn cobs, wheat straw, canola straw, rice straw, oat straw, oat hulls, corn fiber, recycled wood pulp fiber, sawdust, hardwood, for example aspen wood and sawdust, softwood, or a combination thereof. Further, the lignocellulosic feedstock may include cellulosic waste material such as, but not limited to, newsprint, cardboard, sawdust, and the like. For urban areas, the best potential plant biomass feedstock includes yard waste (e.g., grass clippings, leaves, tree clippings, and brush) and vegetable processing waste. It will be understood that refuse derived fuel (RDF) can also be used as biomass feedstock for the present invention.

Lignocellulosic feedstock can include one species of fiber or alternatively, lignocellulosic feedstock can include a mixture of fibers that originate from different lignocellulosic feedstocks. Furthermore, the lignocellulosic feedstock can comprise fresh lignocellulosic feedstock, partially dried lignocellulosic feedstock, fully dried lignocellulosic feedstock or a combination thereof. In general, the term "biomass" as used herein includes all of the terms, plant biomass, liqnocellulosic, cellulosic, and hemicellulosic. It is preferred that the biomass used in the practice of the present invention comprised at least about 30 wt. %, more preferably at least about 50 wt. % cellulose/hemicelluloses, based on the total weight of the biomass. It is also within the scope of this invention that non-plant biomass be used, a non-limiting example of which is animal manure.

The biomass will typically be dried, then reduced to an effective size for gasification. It is preferred to dry the biomass before size reduction, although the biomass can first be reduced in size before drying. Technologies for drying biomass are well known in the art and include both passive as well as active drying. Passive drying is preferred for cost considerations, but depending on the nature of the biomass and its moisture content passive drying may not be able to reduce the moisture level to a level acceptable for being fed to a gasifier. Therefore, some form of active drying, such as the use of an external heat source and/or blowers may be needed. It is preferred that the biomass, after drying, contain no more than about 20 wt. %, preferably not more that about 15 wt. %, and more preferably no more than about 10 wt. % water, based on the total weight of the biomass after drying.

An effective size of the biomass feed will depend on whether the biomass is to be sent directly to a gasifier or to pretreatment step, such as torrefaction step. The biomass is subjected to a size reduction step to reduce it a size suitable for gasification in the first stage, or for feed to a torrefaction step. It is preferred that the size reduction step produce a biomass having a particle size of about 0.1 inch to about 3 inches, preferably from about 0.25 inches to 1.5 inches in the case where the biomass it to be pretreated by torrefaction. If the biomass is to be sent directly to a gasifier then it is preferred that the average particle size be from about 1 to 500 microns, preferably from about 150 microns to 300 microns. The fibrous structure of biomass makes it difficult and costly to reduce its particle size. Non-limiting examples of mechanical size reduction equipment include rotary breakers, roll crushers, jet mills, cryogenic mills, hammer-mills, impactors, tumbling mills, roller mills, shear grinders, and knife mills. Hammer-mills are preferred for the practice of the present invention.

It is preferred that the biomass be torrefied after an initial drying and size reduction step. Torrefaction increases the energy density of biomass materials, particularly cellulosic materials, by decomposing the reactive fraction of hemicelluloses. The result is that the energy content per unit mass of torrefied product is increased. Torrefaction of biomass of the present invention is conducted at temperatures from about 390° F. (199° C.) to about 665° F. (352° C.), preferably from about 435° F. (224° C.) to about 610° F. (321° C.), more preferably from about 480° F. (249° C.) to about 575° F. (302° C.). During torrefaction, the biomass properties are changed, which results in better fuel quality for gasification and combustion. Conventionally, torrefaction is usually followed by pelletizing to yield a product that is suitable as a fuel substitute for coal. For purposes of this invention, the torrefied biomass need not be pelletized, but is instead reduced to a particle size that will be suitable for use in a fluid-bed gasifier. This particle size will typically be in the range of about 1 micron to 500 microns, preferably from about 150 microns to about 300 microns. If the biomass is a plant biomass, some of the cellulose in the biomass will undergo hydrolysis and dehydration reactions. The torrefaction process produces a solid biomass product having a higher energy density than the feedstock and a tor-gas.

Torrefaction is also capable of producing a relatively uniform pretreated biomass from a wide variety of biomass materials. If desired, the conditions of the torrefaction process can be altered to produce a torrefied product having similar energy content and reactivity as that produced from a completely different biomass feedstock. This has advantages in the design of the gasifier feed system and greatly simplifies the gasifier operation with respect to controlling the $H_2$:CO ratio in the resulting syngas.

There is presently no commercial biomass gasification processes designed specifically for biomass as a feedstock. Conventional low-pressure gasifiers require an expensive, and most often economically prohibitive, gas compression step. The high pressure gasifier system of the present invention substantially decreases the size of, and preferably eliminates, the compression step typically required for post-gasifier conversion processes. The gasifier used in the practice of the present invention is preferably operated in the pressure range of about 5 to 50 atmospheres, more preferably from about 10 to 40 atmospheres, and most preferably from about 20 to 30 atmospheres.

Gasifier designs can be broadly grouped into slagging/non-slagging and single or multistage. Non-slagging gasifiers operate at peak temperatures below the fusion temperature of at least a portion of the inorganic constituents contained within the feed stock. Some feed stocks contain inorganic constituents that readily vaporize or form fine particles that become entrained in the gas stream (i.e. silica). Typically, non-slagging gasifiers operate at temperatures below 2000° F. and in many biomass applications must operate below 1800° F. in order to avoid slagging or volatilization/condensation of the inorganic feed constituents. Some biomass gasifier designs incorporate a two stage design since the initial decomposition of the cellulose component involves formation of quantities of carbon-rich materials (commonly referred to as tar, carbon and soot) that react more slowly than other components of the cellulosic feed, and thus require longer residence times and/or higher temperatures to completely gasify. This carbon-rich material is typically collected by use of cyclones, or other solid-gas separation methods, and routed to a second stage in which it can undergo partial oxidation, or combustion, to convert substantially all of any remaining organic constituents. Partial oxidation, leads to the generation of additional syngas and generates additional heat to the gasification stage via hot circulating solids. Combustion leads to flue gas as well as hot solids to be returned to the gasifier.

Substantially all reactions occur simultaneously within the gasification zone in the presence of oxygen. Since the gasification process is endothermic in nature, heat must be supplied in order to maintain the desired temperatures. Gasifiers can also be classified with respect to how they provide this heat. Indirect gasifiers utilize suitable heat transfer devices, preferably tubes located in the gasifier, which tubes are comprised of a metal alloy capable of withstanding the process temperatures of the gasifier. An external source of hot gas is typically passed through the tubes to provide heat that is transferred to the gasification reaction zone within the reactor. The maximum operating temperature for these types of gasifiers is typically ≤1500° F. due to the material limitations associated with the heat transfer device used. Gasifiers designed to operate at high temperatures (≥1800° F.), such as those used for the gasification of coal, employ oxygen in the feed to provide the necessary thermal energy for driving the endothermic reactions by way of partial oxidation. This use of internally generated heat is referred to as a "direct" or "oxygen-blown" gasifier that can achieve substantially complete conversion of the feed carbon.

The term "oxygen" when used herein is taken to mean an oxygen-containing gas, preferably an oxygen-rich gas having in excess of 50 vol. % oxygen, preferably at least 90 vol. %, more preferably at least 95 vol. %, most preferably at least about 99 vol %, Substantially pure oxygen is particularly preferred. One preferred source of oxygen is from a pressure swing adsorption unit, which is well known in the art. Coal gasifiers (direct type) generally operate in what is referred as the slagging mode since the temperatures achieved within the partial oxidation zone is very high (>2000° F.) which can cause inorganic constituents of the feed to undergo "fusion" or are at least partially vaporized or liquefied. The fused or vaporized/liquefied inorganics are typically collected at the bottom of the gasifier and can be periodically or continuously drawn out of the system. However, when this high temperature gasification technology is applied to biomass, problems arise because of the relatively high inorganic content of the biomass feed. Biomass typically contains higher concentrations of inorganic constituents, such as silicon, that can vaporize at elevated temperatures and that can condense and deposit on downstream equipment, and cause fouling of heat transfer surfaces and resulting in operational problems.

The fluidized bed gasification process requires the attainment of appropriate fluidization conditions (gas velocities and solid particle properties), as well as appropriate temperatures for gasification. Operating the gasifier system at elevated pressure strongly impacts the heat transfer and fluidization properties of the system. For example, when operating at 300 psig, the gas throughput is approximately 20 times higher than at 15 psig. Consequently, the amount of oxygen that must be introduced into a high pressure gasifier is also increased, resulting in an even a greater rate of local heat release. This higher heat generation rate can result in local peak temperatures that exceed the desired maximum, resulting in slagging or other undesirable impacts on fluidization. This is a greater problem if biomass is fed to the gasifier since the temperature for slagging is lower than that for other feeds such as coal or pet coke. Consequently, most commercially available gasifier systems of this type for biomass operate at low to modest pressures (<100 psig) in order to balance the fluidization and temperature requirements.

Gasification systems able to operate at elevated pressures (>200 psig) offer significant economic advantages over lower pressure systems, especially when the resulting syngas product is utilized in producing chemicals, or transportation fuels. With a low pressure gasifier, syngas compression after the gasifier is necessary to achieve the >400 psig necessary for feed to commercial catalytic process units. The cost of compression can easily be >10% of the total plant capital and the energy expenditure can amount to 10 to 15% of the incoming feed. Since steam (produced at >300 psig) is the primary fluidizing gas, gasification at elevated pressures is far more economically viable than that of low pressure.

In addition to higher gas throughput, high pressure gasifiers require higher solids throughput as well. Most low pressure gasifiers utilize mechanical feeding systems, such as screw feeders, ram feeders, and conveyors. These systems typically have duty factors below 75%, requiring redundancy for reliable operation, and are best suited for low feed rate applications, making them poorly suited to feed high pressure gasifiers. These systems must also be isolated from the gasifier to prevent hot syngas from entering the feed system and reacting with the raw biomass which can cause the biomass to agglomerate and clog the feed system. Also, condensing steam can adversely affect the feed system. This is typically accomplished either using expensive lock systems to physically isolate the feed systems or purge gases which can result in unwanted diluents in the product gas.

The gasification process as applied to the conversion of carbonaceous materials involves a plurality of individual reactions associated with conversion of carbon, hydrogen, and oxygen into products containing steam, hydrogen, oxides, carbon, soot or tars and hydrocarbons. At elevated temperatures (>1000° F.) associated with gasification, the major products are typically steam, hydrogen, $CO_2$, CO and methane. Chars and soot generated by pyrolysis represent the carbon-rich solids that can also contain small amounts (<5%) of hydrogen. The gasification process of the present invention is conducted at an effective gasification temperature. Such a temperature will be in the range of about 1200° F. to 1800° F., preferably from about 1300° F. to 1700° F.

All commercial gasifier systems that employ an oxygen-rich gas to supply thermal energy through partial oxidation generate localized hot spots at the injection point or zone. The reaction of oxygen in the gasification environment is very fast and for all practical purposes occurs within the jet volume associated with the injection nozzle. The jet of oxygen forms a volume around the nozzle tip, that can be referred to as the partial oxidation, or pox, zone. Within this volume, localized temperatures can approach the adiabatic flame temperature determined by the combustion of the available oxygen and the local fuel which is typically synthesis gas. It will be understood that the terms synthesis gas, syngas, and synthetic gas are used interchangeably herein. The endothermic reactions (gasification and pyrolysis) do not occur as fast as oxidation and consequently heat is generated faster than it is removed. One possible way to mitigate the high temperatures is to transfer cooler solids and gas to the partial oxidation (pox) region. A fluidized bed reactor of circulating inert solids provides a means to mitigate the higher temperatures. A solid having catalytic properties can provide additional heat mitigation through the promotion of the endothermic steam reforming of gaseous hydrocarbons produced during pyrolysis. For example, adding an effective amount of potassium to the circulating inert solids will catalyze the gasification rate of gaseous intermediates produced from the biomass.

Another way to mitigate the high temperatures is to use pulsed oxygen injection so as to keep the maximum, or peak, temperature within the oxygen injection region (also referred to as the flame, or pox zone) below the fusion temperature of inorganics of the biomass feed. This method for controlling temperature involves the controlled periodic injection of oxygen at a flow rate and frequency that prevents the attainment of temperatures at and exceeding the fusion temperature of inorganic constituents of the feed. Additionally, operating at temperatures below about 1800° F. reduces the extent of volatility of these constituents, thereby minimizing fouling of downstream equipment. Although it is preferred that oxygen be introduced with pulsing it is within the scope of this invention to inject a substantially continuous stream of oxygen at a rate and amount that will result in a the conversion of at least 70 vol. % of the organic fraction of the biomass feed.

Temperature control using pulsed oxygen-rich gas is preferably practiced in the gasification stage, but not in the combustion stage. However, the second stage (combustor) can also make use of air, which can be continuously fed. The biomass feed is preferably introduced through a riser at or near the bottom of the fluid bed of the gasification stage fluid bed in which both pyrolysis and gasification occur simultaneously. Any suitable lift gas can be introduced into the riser. Non-limiting examples of preferred lift gases include steam and a mixture of steam and carbon dioxide. Variation of the lift gas composition influences the extent of pyrolysis and hydrolysis reactions that occur in the riser. Variation of the lift gas composition also influences the fluidization properties of the particulate biomass, most importantly its tendency to agglomerate. The feed system is oriented to provide maximum contact of the biomass with oxygen, steam and other fluidizing gases within the fluid bed. The use of both steam and oxygen minimizes the extent of pyrolysis; however, pyrolysis can still proceed to some extent resulting in the production of tars, soot and other carbon-rich solids that inherently gasify at a much slower rate than the initial biomass feed. The heat required in the gasification stage is significant since most of the biomass gasification and all of the pyrolysis occurs in this stage (endothermic reactions). Gasification is preferably operated at temperatures in the range of 1000° F. to 1800° F., more preferably in the range of 1200° F. to 1800° F., and most preferably in the range of 1300° F. to 1700° F. and at pressures ranging from about 5 to about 50 atmospheres, preferably from about 10 to 40 atmospheres, and more preferably from about 20 to 30 atmospheres. Further, the gasification stage will be operated at net reducing conditions whereas the second, or combustion stage, is operated under net oxidizing conditions.

Figure 1:
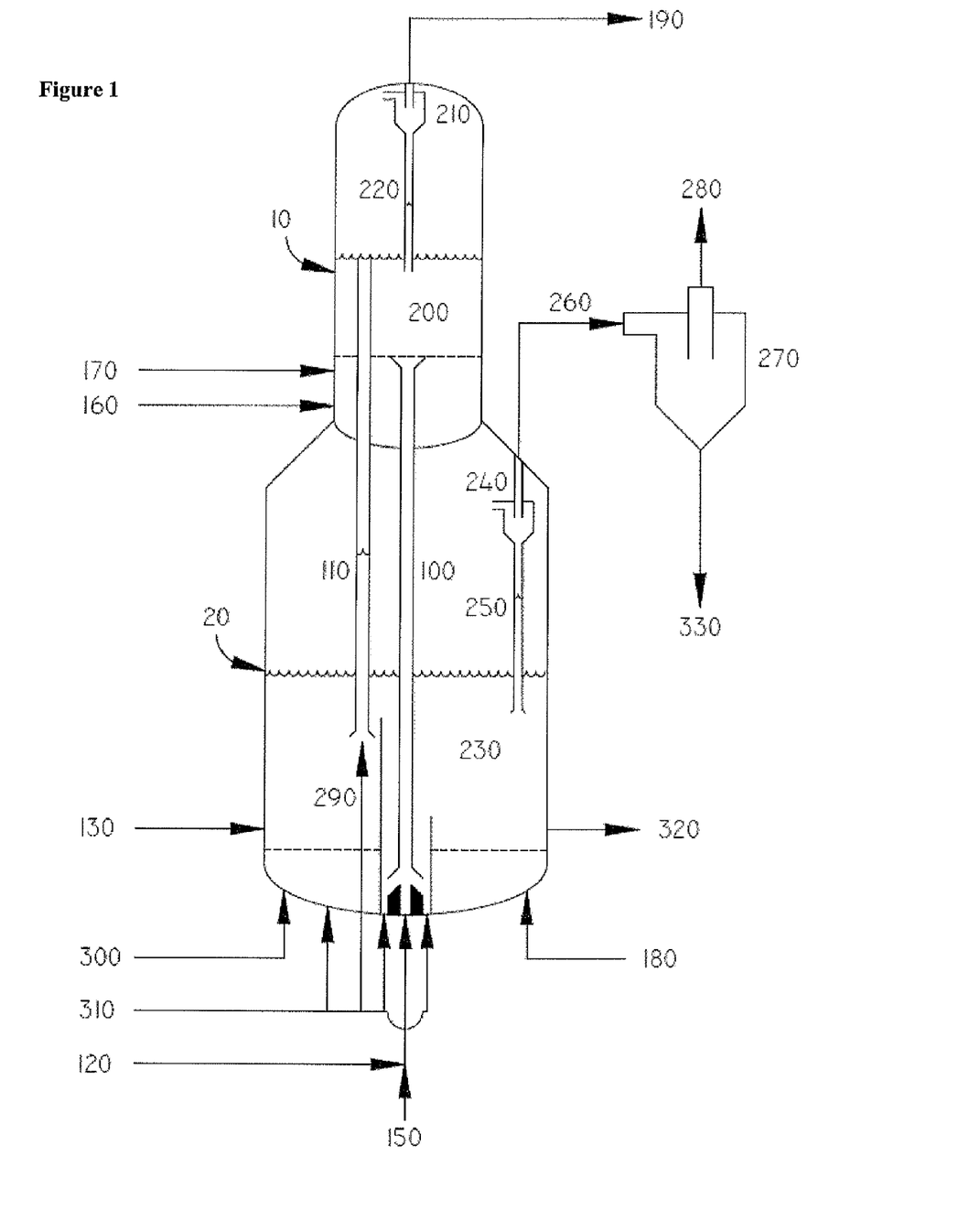
FIG. 1 hereof is a representation of a preferred embodiment of a two stage process unit for converting biomass to a predominantly gaseous product wherein the first stage is a gasification stage and the second stage is a combustion stage.

The instant invention will be better understood with reference to the figures hereof. FIG. 1 hereof presents the major components of a preferred two-stage biomass conversion process unit of the present invention. The process unit is comprised of two fluid bed stages depicted as a first stage designated as reactor 10 and a second stage designated as reactor 20, which sits directly below first stage 10. This first stage is a gasification stage and the second stage is a combustion stage. The two reactors shown in this figure are fluidly connected via riser 100 and down-corner, or standpipe, 110. The feed will preferably be a biomass having a particle size as previously discussed.

The particulate biomass is fed to riser 100 via line 120, which conveys it to the first stage 10 via a lift gas introduced via line 150. The feed system is preferably oriented to provide maximum contact of the biomass with oxygen, steam and other fluidizing gases within fluid bed 200. It will be understood that not all of the biomass feed need be introduced via a riser. At least a fraction of it can be introduced into the gasification stage at any other suitable location in the fluidized bed. Any suitable fluidizing gas can be used in the practice of the present invention. For purposes of this invention, it will be understood that all fluidized beds have a dilute phase zone and a dense phase zone and each are typically expressed as solid volume in that particular zone. For example, the dilute phase zone will typically have a solids volume from about 0.01% to about 15%, preferably from about 0.02% to about 1%, and more preferably from about 0.03% to about 0.1%. The dilute phase zone will typically have about 1% or less of the solids volume contained in the dense phase zone, preferably about 0.1% or less, and more preferably about 0.01% or less. In one embodiment of the present invention, the dense phase zone has a solids volume content of from about 20% to about 40%, preferably from about 15% to about 35%.

In addition to the chosen biomass feed particulates, inert or catalytic fluidization (circulating) solids can be introduced into fluidized beds 200 and 230 in order to facilitate heat transfer, to promote gasification, or both. Preferred fluidization solids include titinia, zirconium oxide, magnesium oxide or mixtures of these with alumina, preferably alpha alumina. The fluidization solids can also be doped with an effective amount of catalytic component, such as calcium, potassium or a mixture thereof. The size range for the fluidization solids will be those based on Group A and Group B of the Geldart Groupings (see Fluidization Engineering, by Kuni et al. Robert E. Krieger Publishing Co., 1969, reprinted 1987). That is, a particle size range from about 1 to 500 microns, preferably from about 20 microns to about 400 mircons and most preferably from about 100 to 300 microns, with densities less than about 1.4 g/cm$^3$. The fluidization solids can be introduced with the initial biomass feed to vessel 10 via line 120 or they can be fed separately through a dedicated nozzle represented by inlet 130 to the second stage 20. They can also be fed at any other suitable location of the process unit by use of any suitable device that is used to incorporate a particulate material into a pressurized vessel, which devices are well known to those having ordinary skill in the art.

The fluidization gas for both gasification and combustion can be any suitable gas. Non-limiting examples of such gases include steam, carbon dioxide, nitrogen, natural gas, liquid hydrocarbons, recycle gas, and syngas. Steam is the preferred fluidization gas, as well as $CO_2$ generated from the biomass feedstock or a mixture of both. More preferred is steam. The fluidization gas is introduced into the first and second stages via a suitable nozzle system, such as via lines 160, 180 and 310 respectively. The location of the inlet conduits for the fluidizing gases will be located at or near the bottom of each fluidized bed. Normal commercial practice is employed in this design based on achieving sufficient gas velocities to suspend the biomass and other solids present within the reactor. The first stage can be operated to adjust the desired composition of the resulting syngas having a $H_2$ to CO ratio from about 0.8 to about 2.3. Nozzle systems comprised of a plurality of nozzles are well known in the art. Oxygen is also introduced at specified locations within the reactor configuration, such as at 170 and 180, in order to generate the thermal energy required to drive the endothermic reactions associated with gasification and reforming. It will be understood that air is preferably injected into the combustion stage via line 180 instead of oxygen. The feed rates of the biomass, oxygen, steam as well as other gases will be established by the criteria for establishing an acceptable gas fluidization rate and providing the appropriate carbon, hydrogen and oxygen ratios for achieving the desired syngas composition.

Because of the high temperatures required for both stages, the system of the present invention is preferably heated using direct methods, such as by addition of oxygen into the first stage and preferably air to the second stage. The maximum temperature within the oxygen injection, or pox, region is preferably below the fusion temperature of at least a portion of the inorganic components of the biomass. The preferred method for controlling this temperature involves the controlled periodic injection of oxygen at a flow rate and frequency that prevents the attainment of the fusion temperature of the inorganic constituents of the biomass feed. Operating gasification at preferred temperatures reduces the extent of volatility of inorganic constituents, thereby minimizing fouling on downstream equipment. Temperature control using pulsed oxygen-rich gas, as previously mentioned, is preferred, but not required in the gasification stage and is not used in the combustion stage.

The products from the gasifier include tars and other carbon rich intermediates arising from pyrolysis as well unreached biomass. The gas phase contains $H_2$ and CO (syngas) as well as $CO_2$, $H_2O$, $CH_4$ and other hydrocarbons arising from the pyrolysis reactions. The gaseous product from the gasification stage is passed to downstream processing to make end products such as various chemicals and transportation fuels. The solids product is sent to the combustion stage, which is operated at a higher temperature in order to facilitate the combustion of the tars and other carbon-rich solids.

As previously mentioned, the biomass within the first stage 10 will undergo both gasification and pyrolysis that will lead to the formation of synthesis gas as well as carbon-rich solids. Pyrolysis can also lead to tar-like solids if allowed to exit the gasifier in an insufficient residence time that will not allow further gasification and pyrolysis to occur. The solids generated in the first stage 10, as well as fluidization solids, travel down down-corner 110 into the second stage 20. The fluidization characteristics of the solids of the first stage 10 and the amount of gas to be moved define the preferred geometry of the riser.

The syngas produced in first stage 10 exits the reactor through the cyclone 210. Solids entrained in the gases to cyclone 210 are returned to the first stage 10 through solids return, or dipleg, 220. Some gases will pass through inter-vessel down-corner 110, but this will not be a significant volume since the flow area of down-corner 110 is relatively small, typically less than about 5% of the total cross sectional area of first stage 10. Also, this gas volume can be further minimized by direct steam injection upward into the down-corner via line 290. A plurality of exit cyclones 210 and down-corners 110 can be employed, especially when the desired throughput rate exceeds the practical limit of a single unit. The resulting syngas product stream is conducted via line 190 to downstream processing. The second, or combustion stage 20, is operated at a temperature at least 50° F. greater, preferably at least about 100° F. greater than the gasification stage in order to reduce the potential for high temperatures within the pox zone. It is preferred that the combustion stage be operated at effective combustion temperatures capable of converting substantially all of the tars and carbon-rich materials. This temperature will preferably be in the range of about 1400° F. to 2200° F., more preferably from about 1600° F. to about 2100° F. The upper temperature of this second stage is the point where an undesirable amount of slag, or fusion, of at least a fraction of the inorganic portion of the biomass occurs. Another limit establishing the upper temperature limit of the gasification stage is excessive volatilization of any inorganic constituent within the biomass (i.e., $Si(OH)_4$, $Na_2O$, $K_2O$, etc.).

Slag formation must be avoided in both gasification stage and combustion stage. Since the overall stoichiometry of the gasification stage and combustion stage are different (reducing vs. oxidizing, respectively), the stable form of the inorganic species can be different in each stage (e.g. carbonates vs. oxides) and will thus have different melting and softening temperatures. Because of these differences, it is possible to safely operate the combustion stage at a higher temperature than the gasification stage without forming slag. In addition, since the molar volume of the stable inorganic components from the gasifier and combustion stage will be necessarily different, cycling the ash between the combustor and gasifier will result in stress corrosion cracking of the ash down to very fine particles that can be elutriated with the syngas product and flue gas and collected downstream of the gasifier.

The total reactor volume available for gasification and pyrolysis preferably corresponds to an effective solids residence time. By "effective solids residence time" we mean that amount of time needed to convert (as a total for both stages) at least about 90 wt. %, preferably at least about 95 wt. %, and more preferably at least about 98 wt % of the carbon of the biomass. This effective amount of time will typically be from about 5 to 100 seconds based on the biomass feed volume. The shortest possible residence time to meet the desired conversion is preferred. Consequently, riser 100 is sized appropriately to assist in maintaining the desired temperature of the gasifier. Operations at higher temperatures in the combustion stage will allow shorter residence times while the converse is true at lower temperatures. The preferred operating temperature and residence time for the gasification stage 10 are based on maximizing the amount of conversion of the biomass to synthesis gas or conversely minimizing the amount of carbon-rich solids (non-syngas products) produced. The depth of fluid bed 200 within the gasification stage will be dependent upon the minimum depth required for stable fluidization and the required residence time as well as gas velocity. Conventional fluid bed parameters can be used, which parameters are well known to those having ordinary skill in the art.

Combustion stage 20 comprises of a fluidized bed 230 wherein carbon-rich solids transferred from the first stage 10 via down-corner 110 are combusted. The fluidization conditions for second stage 20 includes a much higher fraction of fluidization solids and the desired temperature range is higher in order to facilitate combustion of the carbon-rich solids generated in the gasification stage. The total amount of oxygen introduced into the combustion stage gas is preferably sufficient to maintain the desired temperature and is introduced in a suitable manner to avoid excessive temperature stages that will lead to liquefaction, slagging, or fusion of the inorganic constituents of the solids. The temperature of the bed can be controlled by ensuring that there is always excess oxygen present in the bed such that decreasing the flow of the oxygen containing gas would result in a higher temperature and increasing the flow of oxygen containing gas would result in a lower temperature. This control allows the amount of heat delivered to the gasification stage to be controlled which allows for control of the overall heat balance of the gasifier. The depth and diameter of fluid bed 230 is determined by several criteria, including:
a) Minimum fluidization velocity to maintain fluidization within the bad
b) Achieving sufficient residence time to combust a high fraction of the carbon containing solids transferred to the second stage 20.
c) Introducing an oxygen containing gas over a sufficient area and volume to minimize and local hot spots that would lead to slagging of inorganic components.

The cross sectional area and residence time for second stage 20 are larger and longer, respectively, compared to first stage 10. These conditions combined with a higher operating temperature ensure combustion of the carbon containing solids formed during pyrolysis within first stage 10. Oxygen-containing gas, or air, can be introduced through line 180, representing one or more conduits either continuously or in a pulse mode. Fluidization solids that have been heated to the higher operating temperature of the combustion stage 20 are returned to the first stage 10 via the riser 100 where the heated solids further enhance endothermic gasification and pyrolysis reactions. Additional fuel may be added via line 300 as necessary to maintain the heat balance across the entire process, the amount of which will be controlled by such things as the nature of the feed source and the desired syngas ratio.

The effluent gas from second stage 20 will contain some solids that can be removed via one or more cyclones 240. Solids are returned to the fluid bed through solids return line 250. Excess inert solids can also be removed via line 320 or from any other suitable location. There will generally be a significant amount of solids in effluent gas 260; however, through the proper balancing of flow conditions and cyclones, the amount of solids can be controlled as to not impact downstream operations. Specifically, solids produced in second stage 20 are removed via cyclone 270 and line 330. The resulting gaseous effluent can be passed via line 280 directly to heat exchangers to cool the gas prior to subsequent processing.

Figure 2:
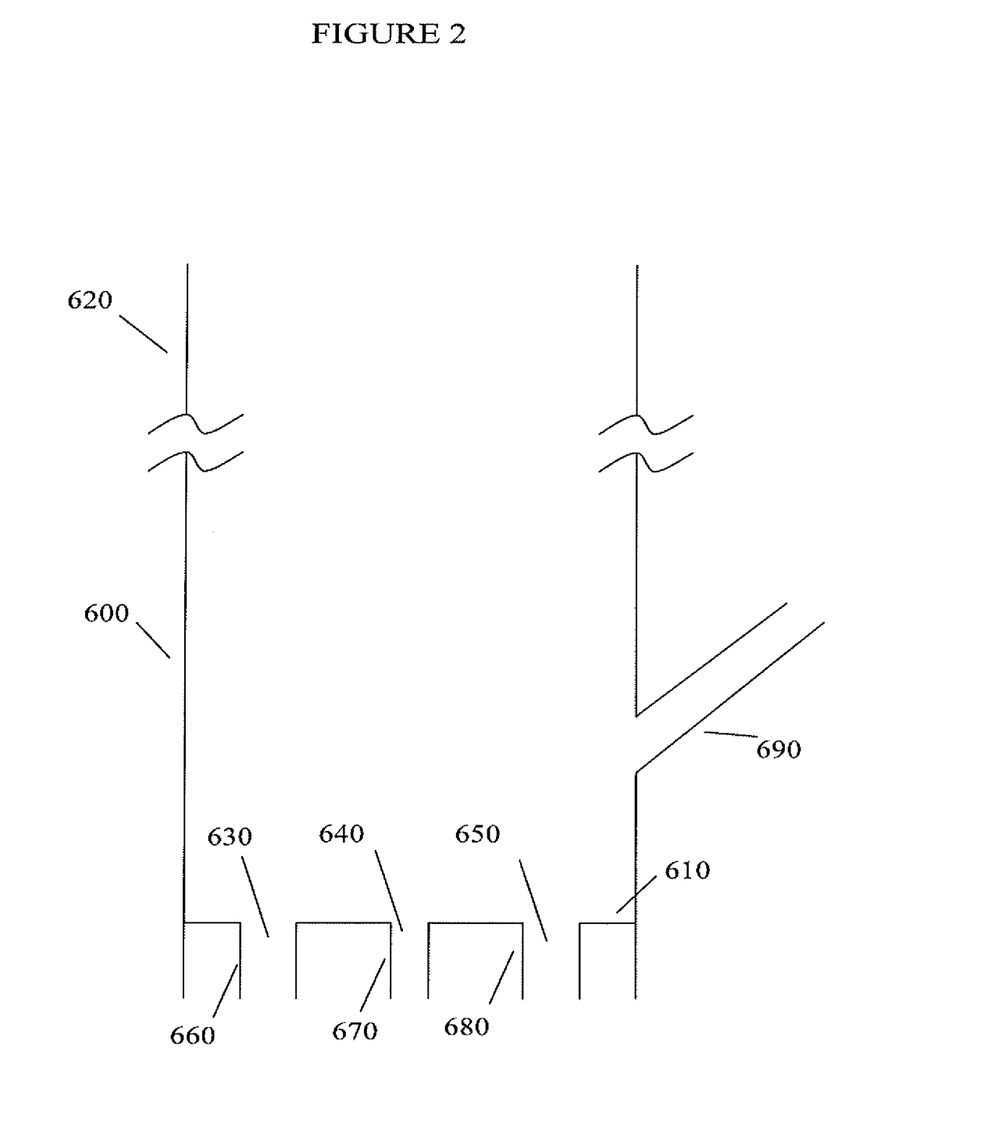
FIG. 2 hereof is representation of a typical section of a gasifier showing one preferred nozzle arrangement wherein fluidizing gas and oxygen for pulsing will be introduced.

FIG. 2 hereof represents the section of the gasifier in which fluidizing gas is introduced showing a pressure containing boundary 600 which originates at the plane in which gas is introduced 610 to the upper portions of the fluidized bed 620. In this drawing, nozzles 630, 640, and 650, which introduce a fluidization gas and which represents a subset of the plurality of nozzles required for fluidization. For simplicity, they are shown to be on a single plane but variations in height above the bottom 610 of the gasification zone can also be utilized. The conduits required for transferring the fluidization gas from the source to the gasification zone 600 are denoted as 660, 670, and 680. There can be a conduit for each nozzle or multiple nozzles can be connected in one or more fluidizing gas conduits. The conduit for introducing solids into the gasifier is shown as 690. This can be one or more conduits and is not significant with respect to this invention. Conduit 690 that conveys solids into the gasifier and which can encompass feed for gasification or partially reacted feed containing char, carbon and/or soot that will undergo either additional gasification, partial oxidation or complete oxidation, depending upon the nature of the gasification stage. In the majority of applications, inert solids used to promote fluidization and heat transfer will also be conveyed through conduit represented by 690.

Figure 3:
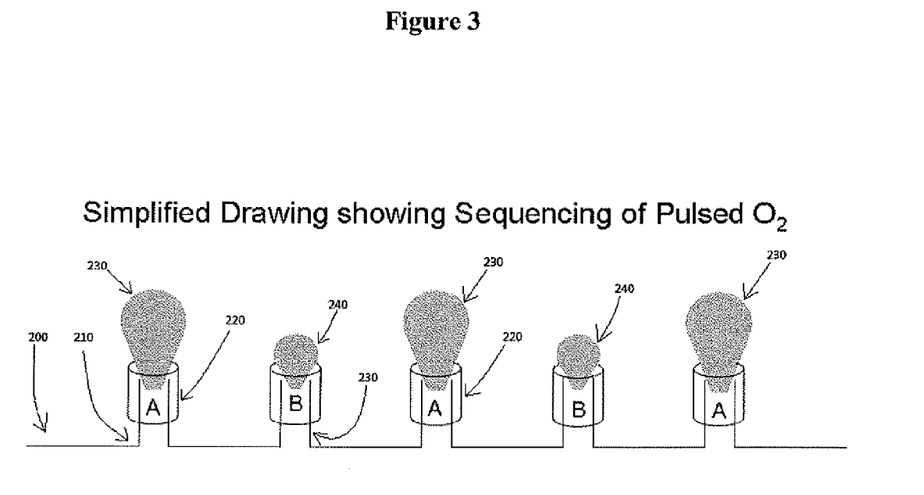
FIG. 3 hereof is a simplified drawing showing what applicants believe to be a preferred oxygen injection sequence utilizing two sets of nozzles.

FIG. 3 hereof presents a simplified drawing of the pulsed $O_2$ sequence. In this example the nozzles conveying the fluidizing gas are shown on a single plane 200. Each nozzle 210 and 230 is of an appropriate diameter and geometry to convey an effective amount of fluidizing gas over a cross section of the gasification zone. A shroud 220 can be part of the nozzle geometry in order to facilitate the entrainment of the bulk fluidized gas and solids into the volume of the jet, or bubble, associated with the fluidization gas 230 and 240. When periodically introducing oxygen into the fluidization gas, there will be a local increase in temperature within the gas volume associated with the jet of oxygen-containing gas. This jet can also be considered a bubble forming at the exit of the nozzle and extending into the fluidized bed. As the $O_2$ flow is cycled from zero flow to some maximum and then decreased back to zero, the jet containing the $O_2$ increases from zero to some maximum and then back to zero. The case of zero $O_2$ flow is not shown in FIG. 2 hereof. Within this jet volume a local temperature rise will occur due to the relatively high oxidation rate compared to the gasification reaction. The temperature rise will dependent upon the volume of the $O_2$ introduced during the pulsed $O_2$ time period.

Figure 4:
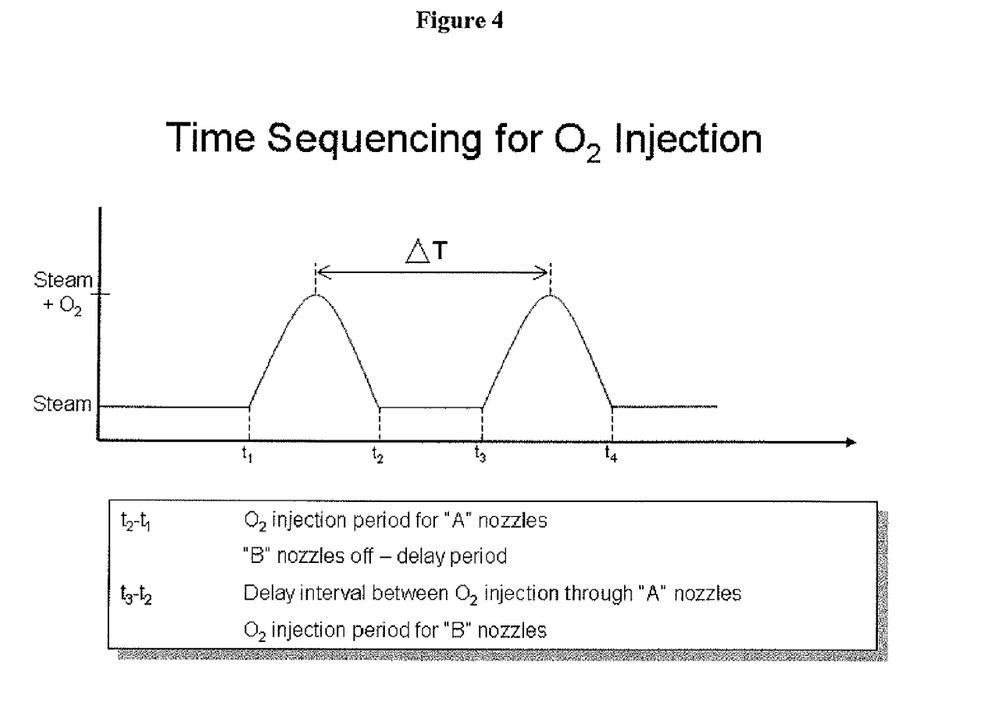
FIG. 4 hereof is a simplified drawing showing what applicants believe to be the sequencing of pulsed oxygen into the gasification reactor of the present invention.

FIG. 4 presents a qualitative plot of an $O_2$ injection rate. The amount of $O_2$ introduced during each pulse cycle will establish the maximum temperature rise within the jet. The volume of $O_2$ introduced in each pulse is established by integrating the flow rate over the characteristic time period $(t_2-t_1)$ and the interval between pulses is designated by $(t_3-t_2)$. FIG.

4 refers to two classes of nozzles with "A" and "B" designations. This is a simple example in which adjacent nozzles (A and B) alternate pulsing in order to avoid a local high concentration of $O_2$ which can lead to a high local temperature. Although only two sets of nozzles are shown in FIG. 3 hereof it will be understood that any number of sets of nozzles can be used within practical limits. Also, any cycle sequence can be used to achieve the desired oxygen duty within the gasification zone. Further, although it may be preferred to stop gas from injecting into the gasification zone through any given set of nozzles it will be understood that a reduced flow of oxygen-containing gas can be made to flow through any one or more sets of nozzle during any cycle sequence. Steam or another gas (syngas, $N_2$, $CO_2$ can also be used during the interval when $O_2$ is not being injected at the maximum rate.

The application of the present invention involves estimating the local temperature rise of the jet during the time period in which oxygen is introduced. Before determining the $O_2$ pulsation frequency and flow rate one must first establish the nozzle design required to achieve acceptable fluidization. This is relatively straight forward to one skilled in the art and involves establishing the fluidization properties for the feed, reaction intermediates, and inert solids in the fluidized bed. Once established, a heat balance over the various stages of the gasifier is required to determine how much oxygen needs to be introduced in the gasification zone. This is again straight forward to one skilled in the art of fluidized beds. The amount of oxygen to be introduced into each stage can then be distributed over the nozzle geometry established for fluidization. One then determines if this oxygen requirement can be introduced over one or more subsets of nozzles for each stage, recognizing that the jet, or bubble, detachment from fundamental principals follows the relationship;

$$1/t_{detach} \text{ proportional to } (g/Q)^{1/5}$$

where $t_{detach}$ is the time frame in which gas that enters through the nozzle detaches and enters the fluidized bed, g is the gravitational constant, and Q is the flow rate. The detachment frequency is relatively insensitive to the total flow Q and in the application of this invention the total flow rate through each nozzle is not a significant consideration. The pulsing frequency $(t_3-t_2)$ for $O_2$ must be less then this characteristic frequency which can be determined empirically or through direct measurement.

The temperature rise within the jet is dependent upon the flow rate of $O_2$ and the rate of local entrainment within each nozzle. Entrainment rates for specific nozzles must be empirically established since it is highly dependent upon the local geometry and local solids concentration. Empirical correlations exist that allow one to estimate the solids flux into a jet and from these estimates a local temperature rise within the jet can be established from the amount of oxygen which must be introduced into each nozzle. The invention requires that the local temperature rise based on the estimated entrainment of the bulk fluidization material not exceed the desired maximum operating temperature (in the range of about 1700° F. to 2000° F.). If this is the case, then the nozzle geometry for the fluidizing gas must be modified to allow less oxygen per nozzle. This modification can involve the use of smaller nozzle diameters, solids distribution elements in the feed conduit(s) (690 in FIG. 2 hereof) or the use of entrainment devices (such as shrouds) around each oxygen injection nozzle to facilitate entrainment.

Returning again to FIG. 4 which presents a simplified drawing of the use of pulsed $O_2$. At the onset of the pulse, the pox zone for each nozzle is relatively small with only a modest increase in temperature. As time elapses, the incoming oxygen allows the pox zone to fully develop leading to a larger volume and higher temperatures within the zone. During this period of development, the temperature within the pox zone is increasing due to a combination of increasing oxygen flow and a decrease in the surface area to volume ratio. The duration of the pulse must be less than the time required to fully develop the pox zone. This time is approximated by the velocity of the incoming oxygen jet over the length of the penetration of the jet. The velocity is determined by the flow rate and the $O_2$ nozzle diameter while the jet penetration is established using existing correlations available in the literature and/or detailed momentum modeling (using computational fluid dynamics). The temperature within the pox zone during the pulsing period is determined by use of a heat balance relating the energy being released through pox and the cooling occurring due to the flux of cooler solids and gases passing through the pox zone. The heat balance can be solved within the boundaries defined by the extent of mass flux and the amount of endothermic reactions occurring within the pox zone. Using these boundaries, one can establish a temperature rise which is below the fusion and/or vapor pressure limit of the inorganic constituents within the biomass feed.

In the case where local temperature is excessive in a specific gasifier section, it is possible to employ other sections of the gasifier system where $O_2$ can be introduced without exceeding the local maximum desired temperature.

What is claimed is:

1. A process for converting a biomass material to a syngas, which biomass material has an organic fraction and an inorganic fraction, which process is performed in a two-stage fluid bed process unit wherein the first stage is a fluid bed gasification stage and the second stage is a fluid bed combustion stage and wherein the two stages are fluidly connected by way of a first conduit having an inlet end and an outlet end wherein the inlet end is located in said combustion stage and said outlet end is located in said gasification stage and a second conduit having an inlet end located in said gasification stage and an outlet end located in said combustion stage; which process comprising:
    a) introducing an effective amount of a fluidizing gas through at least one set of a plurality of nozzles located at the bottom section of both the gasification stage and the combustion stage to maintain both beds of both stages in a fluidized form;
    b) introducing an effective amount of oxygen through one or more plurality of nozzles located at the bottom section of said gasification stage to maintain a predetermined temperature of the fluid bed of the gasification stage below the fusion temperature of at least a portion of the inorganic fraction of the biomass material;
    c) maintaining said bulk fluid bed gasification stage at a temperature from about 1000° F. to about 1800° F. and under net reducing conditions;
    d) introducing a biomass material, having an effective average particle size, through the inlet of said first conduit and transporting it to said gasification stage wherein at least about 70 wt. % of the organic fraction of said biomass is converted to a syngas product and a particulate solids product;
    e) conducting at least a portion of said syngas product to a solid/gas separation zone wherein any particulates greater than a predetermined size that are entrained in the syngas product are separated and returned to said gasification zone and wherein the treated syngas product is collected or sent to downstream processing;

f) conducting at least a portion of the fluidizing solids from said gasification stage through said second conduit to a fluidized combustion stage operated at a temperature at least 50° F. greater than said gasification stage to result in the combustion of at least a fraction of the particulate solids product of said gasification stages and heating said fluidizing solids;

g) conducting said heated fluidizing solids from said combustion stage through said first conduit to said gasification stage, thus providing a portion of the heat needed for said gasification state; and h) removing any excess solids from the gasification process unit to maintain a predetermined balance of solids.

2. The process of claim 1 wherein said oxygen is introduced into the gasification stage by pulsing.

3. The process of claim 2 wherein said oxygen is pulsed through as least two sets of nozzles wherein one set is introducing oxygen at the desired maximum rate while the other set is at rest, or flowing a reduced rate of oxygen.

4. The process of claim 3 wherein an effective amount of fluidizing gas other than oxygen is introduced with oxygen in said other set of nozzles.

5. The process of claim 2 wherein oxygen is introduced into the gasification stage through only one nozzle.

6. The process of claim 1 wherein the biomass material is dried then reduced to an average particle size from about 1 micron to about 500 microns.

7. The process of claim 6 wherein the biomass is reduced in size to an average particle size of about 150 microns to about 300 microns.

8. The process of claim 1 wherein the biomass material is reduced in size to an average particle size up to about 3 inches, then subjected to torrefaction at a temperature from about 390° F. to about 665° F. then further reduced in size to about 1 micron to about 500 microns prior to being introduced to the gasification stage.

9. The process of claim 8 wherein the torrefied biomass is reduced in size to an average particles size between about 150 microns to about 300 microns.

10. The process of claim 1 wherein the biomass material is a lignocellulose material comprised of at least about 50 wt. % cellulose, hemicelluloses, or both.

11. The process of claim 10 wherein the biomass material is comprised of at least about 20 wt. % cellulose, hemicellulose, or both.

12. The process of claim 1 wherein the fluidizing gas for both the gasification stage and combustion stage is selected from the group consisting of steam, carbon dioxide, air, nitrogen, natural gas, C1 to C4 hydrocarbons, recycle gas, syngas, and mixtures thereof.

13. The process of claim 12 wherein the fluidizing gas for the gasification stage is steam.

14. The process of claim 12 wherein the fluidizing gas for the combustion stage is air.

15. The process of claim 1 wherein the fluidizing solids are an alpha alumina.

16. The process of claim 1 wherein the fluidizing solids are selected from the group consisting of titania, zirconium oxide, and magnesium oxide.

17. The process of claim 16 wherein the fluidizing solids also contain alumina.

18. The process of claim 1 wherein the solids residence time of the gasification stage plus the combustion stage is a time effective for converting at least about 90 wt. % of the carbon present in the biomass.

19. The process of claim 1 wherein the solids residence time of the gasification stage plus the combustion stage is a time effective for converting at least about 95 wt. % of the carbon present in the biomass.

20. The process of claim 1 wherein the gasification stage is physically located above the combustion stage.

21. The process of claim 1 wherein the combustion stage is physically located above the gasification stage.

* * * * *